United States Patent [19]

Cope et al.

[11] Patent Number: 4,978,548

[45] Date of Patent: Dec. 18, 1990

[54] METHOD AND APPARATUS FOR CONTINUOUS PRODUCING OF TORTILLA CHIPS

[75] Inventors: Johanthan C. Cope; Alan E. Davis; William B. Pitman; Kathy M. Row, all of Madera, Calif.

[73] Assignee: Valley Grain Products, Inc., Madera, Calif.

[21] Appl. No.: 410,492

[22] Filed: Sep. 21, 1989

[51] Int. Cl.$^5$ .................. A21C 15/00; A47J 37/00
[52] U.S. Cl. .................. 426/439; 99/352; 99/404; 99/443 C; 426/497; 426/505
[58] Field of Search .......... 426/438, 439, 497, 505, 426/549, 524, 518; 99/352, 404, 443 C, 470

[56] References Cited

U.S. PATENT DOCUMENTS 3,930,049  12/1975  Mattson .................. 426/439
4,197,793   4/1980  Hanson et al. .............. 99/404

Primary Examiner—George Yeung
Attorney, Agent, or Firm—Harris, Kern, Wallen & Tinsley

[57] ABSTRACT

Method and apparatus for continuous production of tortilla chips, including mixing tortilla flour and water to form a dough, rolling the dough into a coninuous sheet, cutting tortilla shapes from the sheet, moving the tortilla shapes continuously through a baking oven to produce baked products, moving the baked products continuously along an equilibration conveyor to substantially equalize the moisture content of each baked product throughout the product to form an equilibrated product, moving the equilibrated product continuously through a refrigeration unit to cool the product to form a cooled product, cutting the cooled products into chip shapes, and moving the chip shapes to a fryer to produce the tortilla chips. The frying step may be continuous or batch as desired.

16 Claims, 2 Drawing Sheets

METHOD AND APPARATUS FOR CONTINUOUS PRODUCING OF TORTILLA CHIPS

BACKGROUND OF THE INVENTION

This invention relates to methods and apparatus for the continuous manufacture of food products, and in particular, for the manufacture of the now popular product known generally as tortilla chips.

A tortilla is a baked grain product which originated in Mexico and is now widely used throughout the world. The word "tortilla" as used herein is a product which may be disk shaped or square or otherwise, and typically is in the order of four inches to eight inches wide.

Tortilla chips in the form of pieces of tortillas are also widely sold and consumed today. The tortilla chip was originally made from the whole tortilla which was baked one day and fried the next day, typically not less than 4 to 8 hours and normally about 24 hours after baking. In the original process, the tortilla chips were produced by hand cutting the whole baked tortilla, and frying the hand cut chip shapes in batches. Sometimes the baked tortillas are refrigerated and sometimes they are stored at room temperature during the interval between baking and frying.

Unused baked tortillas spoil rapidly, dry out and are not desirable for consumption as a bread a day or two after baking when they are no longer a fresh, soft product. An initial reason for producing chips was to salvage the rapidly deteriorating baked tortilla.

The tortilla chip is similar to the potato chip and is intended to be finger food. The chips typically are wedge shaped or strip shaped with a maximum dimension of less than about 3 inches. The phrase "tortilla chip" is intended to cover these various shapes and sizes.

The product produced by the this method with the baked tortillas being stored in bulk for about a day prior to cutting and frying, is known as the old fashioned, home style or authentic tortilla chip.

As the demand for tortilla chips grew, methods and apparatus for automatically producing tortilla chips in high volume have been developed. In the conventional automated system, a dough is produced by cooking whole corn and grinding it wet into a dough or using instant corn masa flour mixed with water into a dough, and the dough is rolled into a sheet. This dough is sometimes referred to as "masa". The sheeted dough is cut into the desired chip shape, and the chips are baked to form baked chip shapes. The baked shapes may be conveyed immediately to a continuous fryer or they may be conveyed for varying time periods and in ambient air or humidity controlled environments prior to frying to obtain the desired tortilla chip. The added time and conditioning of the baked shapes prior to frying achieves a uniform moisture content throughout the shape, the skin of which has been baked and dried during the baking. This conditioning affects the texture, crispiness, oil content and flavor of the tortilla chip. This automated process was a deviation from the original old fashioned or home style process of baking the whole tortilla.

The old fashioned chip made from tortillas cut and fried has distinct taste and texture characteristics which differentiate it from the later automated process, and the old fashioned chip is considered by many to be noticeably different and better than the chip made by the automated process and usually commands a premium price. At the same time, in the automated process the chips are produced at considerably higher volume and lower cost.

SUMMARY OF THE INVENTION

Accordingly, it is an object of the present invention to provide a new and improved method and apparatus for continuous production of tortilla chips, which chips have the desirable characteristics of the old fashioned chip, while being produced at rates and costs similar to those of the conventional high speed, automated process.

In the preferred method of the invention, tortilla flour and water are mixed into a dough which is rolled into a continuous sheet from which tortilla shapes are cut. The tortilla shapes are continuously moved through a baking oven to produce baked products which are then continuously moved along an equilibration conveyor to substantially equalize the moisture content within the products. The moisture equalized whole tortilla products are continually moved through a refrigerator unit to cool the products which are then stacked as whole tortillas and cut into chip shapes. The chip shapes are continuously moved to a fryer to complete the production of the tortilla chips. The frying step may be continuous or batch as desired.

The apparatus of the invention includes the oven, refrigerator unit, chip cutter and fryer, and conveyors for continuous movement of the product in the manufacture of tortilla chips.

Other objects, advantages, features and results will more fully appear in the course of the following description.

DESCRIPTION OF THE PREFERRED EMBODIMENT

Figure 1:
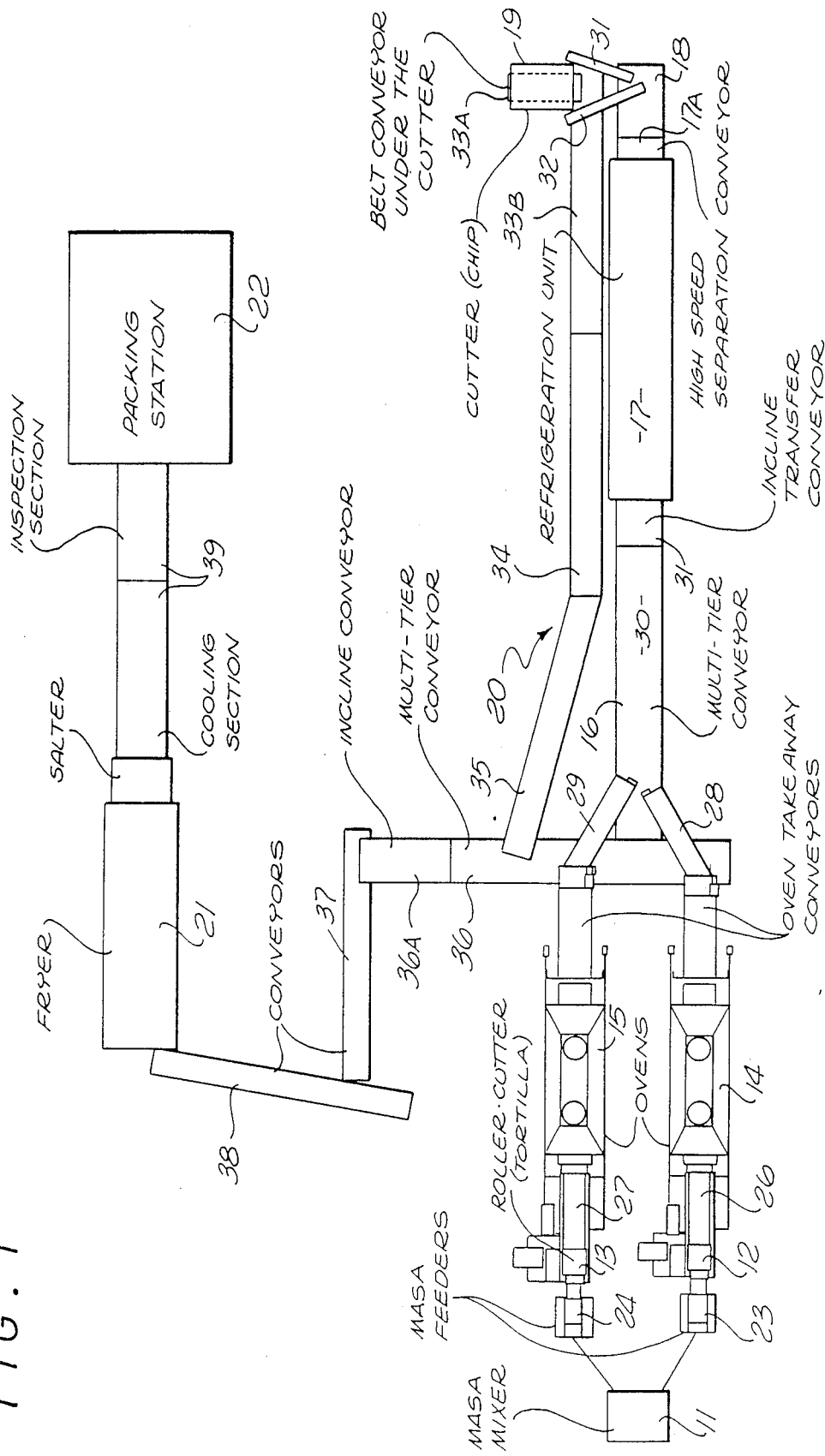
FIG. 1 is a diagramatic illustration in plan form of a tortilla chip cooker incorporating the presently preferred embodiment of the invention.
Figure 2:
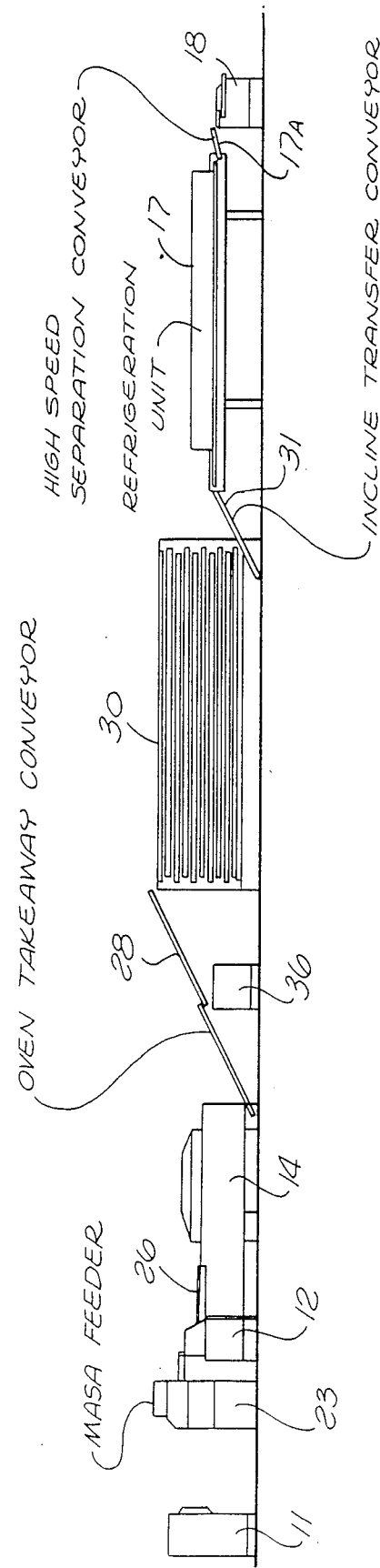
FIG. 2 is a diagramtic side view of the initial portion of the cooker of FIG. 1.

The apparatus as shown in the drawings includes a dough or masa mixer 11, and dough roller and cutter units 12, 13. The apparatus also includes ovens 14, 15, which are operated in parallel, an equilibration conveyor 16, a refrigeration unit 17, a stacker 18, and another cutter 19.

The apparatus also includes a chip conveyor 20, a fryer 21 and a packing station 22.

In operation, the ingredients for the dough are mixed in the mixer 11, the dough is dumped into feeders 23, 24 for the roller cutters 12, 13 where the dough is rolled into a thin continuous sheet, and the whole tortilla shapes are cut from the sheet.

The tortilla shapes from the roller cutter are transferred to the ovens 14, 15 on conveyors 26, 27 respectively. The baked products from the ovens are carried on the equilibration conveyor 16 to the refrigeration unit 17.

In the embodiment illustrated, several separate conveyors are utilized to provide the equilibration conveyor 16. Conveyors 28 and 29 are provided at the outputs of the ovens 14, 15, respectively, for transferring the baked products to a multi-tier conveyor 30 which provides a substantial dwell time for the baked products in a relatively short installation. The baked products are transferred from the conveyor 30 to the refrigeration unit 17 by an incline transfer conveyor 31.

The baked and refrigerated products exit the refrigeration unit 17 onto a high speed separation conveyor 17A which moves them to counter stacker 18. The stacked products are transferred to the chip cutter 19 by dual conveyors 31 and 32. After cutting the cut chip shapes then fall onto the first of a group of conveyors 20.

The chip shape conveyor 20 comprises conveyors 33A, 33B, 34, and 35, a multi-tier conveyor 36, an incline conveyor 36A, a transfer conveyor 37 and another transfer conveyor 38. The fried chips from the fryer are transferred on another conveyor 39 to the packing station 22.

The various components of the apparatus may be conventional in construction and conventional in their operation as individual components. The features of the invention which enables the continuous production of the old fashioned tortilla chip reside in the combination of the components of the apparatus and in the combination of the operating steps.

The presently preferred parameters for operation of the apparatus in the continuous production of the old fashioned tortilla chips of the invention are as follows.

| The dough constitutents | |
| --- | --- |
| Valley Grain Tortilla #2 flour | 150 pounds |
| Valley Grain Tortilla Chip #4 flour | 50 pounds |
| lime (food grade) | 150 grams |
| water | 190 pounds |

Dry mix for 1 minute and wet mix for 8 minutes to a moisture content of 50 to 60%. The pH of the mix is 7.5 to 10.5. Sheeting cutter tortilla diameter 6⅛ inches. Bake at 420° to 500° F. cavity temperature or 800° to 850° F. belt temperature, with oven dwell time 18 to 25 seconds. The dough wet weight is 160 to 162 grams per 6 count. The tortilla baked weight is 253 to 267 grams per 12 count. The moisture content of the baked product is 35 to 42%. The equilibration conveyor dwell time is 1 to 9 minutes, preferably 2 to 5 minutes, with 2½ minutes usually used. The refrigeration unit temperature is 0° to −80° F., with dwell times of about 1 to 2 minutes, and with the cooled product temperature 20° to 40° F., preferably 30° to 38° F. The dwell time on the conveyors between the cutter and the fryer is 30 seconds to 15 minutes, preferably in the range of 1 to 10 minutes. The product is fried in the fryer, using quality cooking oil at a temperature of 370° to 405° F., for 40 to 60 seconds providing chips with a finished weight of 9 to 10 chips per ounce, moisture content of 1 to 2%, fat content of 23 to 28%, and salt content of 0.7 to 1.0%, The presently preferred formulation for the masa mix is as set out above. The flour can be 100% yellow or 100% white or any combination thereof. Various additives to the flour may be utilized, including mono and diglycerides, cellulouse gums, food grade lime and other dough and flavor conditioners. Such additives can be used to modify color, texture, flavor and dough conditions to enhance machinability on different types of equipment.

The equilibration time for the baked tortilla, the temperature reduction and the final temperature of the baked tortilla prior to cutting into chip shape and frying can be changed within limits to obtain changes in taste and texture of the finished product. Once a set of preferred characteristics for the product have been determined, these parameters should be closely observed in order to achieve a uniform product.

After the baked tortilla shapes have been equilibrated and cooled, they are cut into chip shapes for subsequent frying. Following the stabilizing step, the tortilla shapes preferably are stacked vertically in batches at the stacker, with the number of units per stack being determined by count or height or weight as production desires. The stacked baked tortilla shapes are cut into the desired chip shapes.

As a result of the preconditioning of the baked tortillas in the equilibration conveyor and refrigeration unit, the cut tortilla shapes (the chip shapes) readily separate as they are dropped onto the conveyor 33A. This is in contrast to the conventional system wherein the tortilla shapes that have been stacked prior to refrigeration are later pressure cut in a stack. Such tortillas often are stuck together in the stack, and the cutting pressure further bonds the cut shapes together. By following the preconditioning operation of the present invention, the normal sticking together is eliminated and the texture achieved with the preconditioning is maintained throughout the remainder of the process.

In a typical cutter, the stack of tortilla shapes is pushed through a mixed size die of knife blades with the resulting varying size pieces falling onto the conveyor.

The chip shapes are then fried in a conventional continuous fryer, and may be salted or seasoned or left plain as desired. A batch fryer may be used if desired. The completed tortilla chip is now ready for packaging.

We claim:

1. A method for continuous production of tortilla chips, including the steps of:
    mixing tortilla flour and water to form a dough;
    rolling the dough into a continuous sheet;
    cutting tortilla shapes from the sheet;
    moving the tortilla shapes continuously through a baking oven to produce baked products;
    moving the baked products continuously along an equilibration conveyor to substantially equalize the moisture content of each baked product throughout the product to form an equilibrated product;
    moving the equilibrated product continuously through a refrigerator unit to cool the product to form a cooled product;
    cutting the cooled products into chip shapes; and
    moving the chip shapes to a fryer to produce the tortilla chips.

2. The method as defined in claim 1 including the step of stacking the cooled products in stacks prior to cutting into chip shapes.

3. The method as defined in claim 1 including maintaining the baked products on the equilibration conveyor prior to refrigeration for about 1 to about 9 minutes, and cooling the baked products in the refrigerator unit to about 20 to about 40 degrees farenheit.

4. The method as defined in claim 3 including maintaining the baked products in the refrigerator unit for about 1 to 2 minutes and cooling the baked products to about 30 to about 38 degrees farenheit.

5. The method as defined in claim 3 including maintaining the chip shapes at ambient temperature prior to frying for about 30 seconds to about 15 minutes.

6. The method as defined in claim 5 including baking the dough to a moisture content of about 35 to about 42 percent.

7. The method as defined in claim 6 including maintaining the tortilla shapes in the oven for about 18 to about 25 seconds at a cavity temperature of about 420 to about 500 degrees farenheit.

8. The method as defined in claim 5 including mixing the dough to a moisture content of about 50 to about 60 percent and to a pH of about 7.5 to about 10.5.

9. The method as defined in claim 1 including maintaining the chip shapes at ambient temperature prior to frying for about 30 seconds to about 15 minutes.

10. The method as defined in claim 1 including moving the chip shapes through the fryer continuously.

11. The method as defined in claim 1 including moving the chip shapes through the fryer in batches.

12. In an apparatus for continuous production of tortilla chips, the combination of:
   an oven for baking tortilla shapes to produce baked products;
   a refrigeration unit for cooling products to produce cooled products;
   an equilbration conveyor for continuously moving said baked products from said oven to said refrigeration unit;
   a chip cutter for cutting said cooled products into chip shapes;
   a fryer for frying said chip shapes to produce tortilla chips; and
   a chip shape conveyor for moving chip shapes from said chip cutter to said fryer.

13. An apparatus as defined in claim 12 including a stacker positioned between said refrigeration unit and said chip cutter for stacking cooled products from said refrigeration unit.

14. An apparatus as defined in claim 13 including:
   a mixer for mixing flour and water to produce dough;
   a dough roller for rolling dough from said mixer into a continuous sheet;
   a tortilla cutter for cutting tortilla shapes from said sheet; and
   a conveyor for continuously moving said tortilla shapes into said oven.

15. An apparatus as defined in claim 12 wherein said fryer is a continuous fryer.

16. An apparatus as defined in claim 12 wherein said fryer is a batch fryer.

* * * * *